May 18, 1926.
F. C. FANTZ
RELIEF VALVE
Filed April 9, 1921
1,584,760
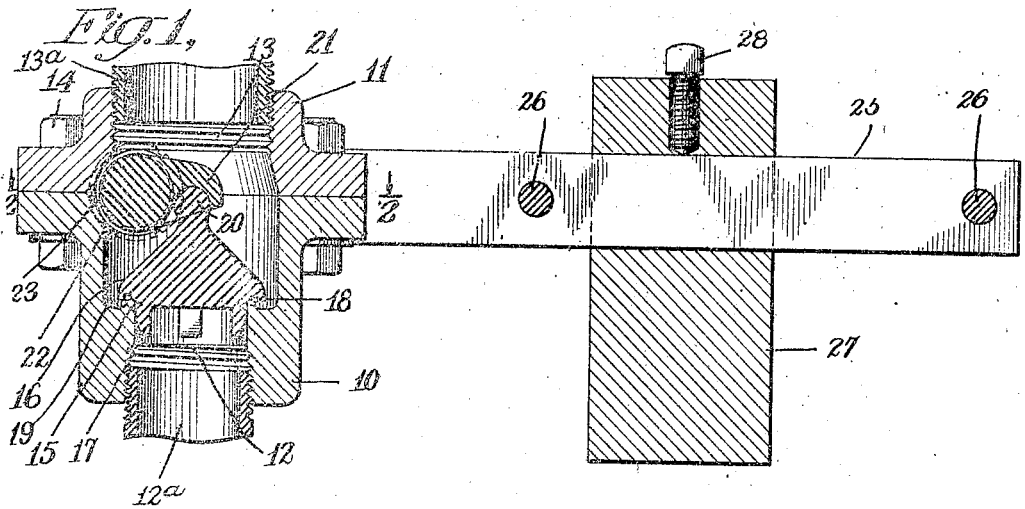
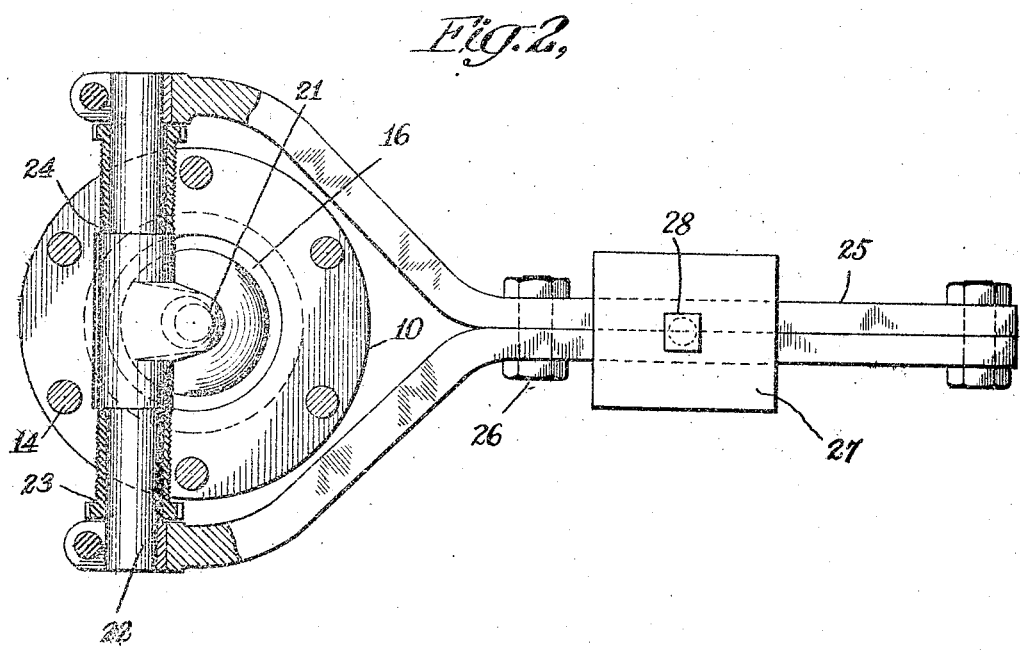
Inventor
Fred C. Fantz
By his Attorney Patented May 18, 1926.

1,584,760

UNITED STATES PATENT OFFICE.

FRED C. FANTZ, OF PORT ARTHUR, TEXAS, ASSIGNOR TO THE TEXAS COMPANY, OF NEW YORK, N. Y., A CORPORATION OF TEXAS.

RELIEF VALVE.

Application filed April 9, 1921. Serial No. 460,040.

This invention relates to relief valves that are entirely enclosed and has for a principal object the construction of a valve mechanism that will relieve the pressure of fluids at predetermined pressures and will at the same time permit the retention of the relieved fluids within certain limits so that they may be safely discharged at a remote point.

Another object of the invention is to provide a valve that is simple and durable in construction and will function with quickness and reliability in order to relieve the pressure at any desired point.

Accordingly, one of the features of the present invention resides in a relief valve that is entirely enclosed within a casing having its inlet end in communication with the supply of fluid and its outlet end connected to a discharge pipe for conducting the released fluids to a suitable place of discharge. The valve being entirely enclosed and thus inaccessible, provision is made whereby the valve may be set or adjusted from the outside by suitable mechanism extending through the wall of the casing and suitably packed to prevent leakage.

Other features of the invention include the construction and arrangement of the valve and valve seat whereby the valve is rendered buoyant and quickly responsive, the provision of guiding means to insure accurate seating of the valve, and the improved mechanism for freely transmitting the movements of the valve to a point outside the valve casing.

Other objects and features of the improved relief valve will become apparent from the following detailed description of the invention.

In the drawings which illustrate a preferred form of the invention:

Figure 1 is a vertical section of an apparatus constructed in accordance with the invention and constituting an embodiment thereof.

Figure 2 is a plan view, partially in section.

The valve casing comprises a hollow body 10 and a cap 11, the body being provided with an inlet 12, communicating with a supply pipe 12ª, and the cap having an outlet 13 which is connected to a discharge pipe 13ª. The body and cap may be fastened together by means of bolts 14.

The body 10 contains an annular rim 15 which forms a seat for the valve 16. The valve is provided with guide projections 17 extending in the direction of movement of the valve and adapted to engage the inner peripheral wall of the valve seat to insure proper seating of the valve. It is also preferably equipped with an annular groove 18 in its seat-engaging face which cooperates with an annular depression 19 surrounding the valve seat 15 in the valve body to give the valve the desired buoyancy and quick operation during the opening of the valve.

The valve is preferably conical in form having a ball portion 20 at the apex thereof. The ball is adapted to engage in a socket in a valve arm 21 which is mounted on a shaft 22. The shaft is supported in bearings in the valve casing and each end of the shaft extends outside the casing. Preferably each bearing consists of a hollow cylindrical member 23 threaded into the casing and having a countersunk portion for suitable packing material 24, whereby leakage of the fluid medium is prevented.

A pair of arms 25 are fastened together by means of bolts 26 and the inner end of each arm is bent in order to form a yoke each end of which is suitably attached to the shaft 22. The two-part arm 25, thus formed, carries a weight 27 which is provided with a set screw 28 in order that the weight may be adjusted in position for any predetermined pressure as will readily be understood by those skilled in the art. The valve, which is located entirely within the casing, may thus be adjusted or set from the exterior so as to open at any predetermined pressure.

In operation when the pressure exerted through the inlet upon the valve has reached the point for which the valve is set it will be moved off its seat and the upward movement of the valve will be transmitted through the ball and socket joint to the valve lever 21, thus rotating the shaft 22 and raising the arm 25 and weight 27. When the valve is thus moved off its seat the released fluids are projected into the annular groove 18 and thence directed into the annular depression 19, whereby the valve is lifted very quickly. The fluids are then allowed to pass through the valve chamber and may be removed by means of pipe 13ª communicating with the opening 13. In this manner the pressure of the contained fluids is relieved but at the same time the fluids are confined within the pipe 13ª and retained within limits while being conducted to a safe and suitable place to be discharged. When the pressure has fallen a predetermined amount the action of the weight will force the valve back upon its seat, the guiding projections 17 insuring an accurate and proper seating thereof.

Apparatus of preferred form and construction has been illustrated and described for the purpose of showing a way in which this invention may be used, but the inventive thought upon which the application is based, is broader than this illustrative embodiment thereof, and I therefore intend no limitations other than those imposed by the appended claim.

What I claim is:

A relief-valve comprising a valve casing having a lower inlet and an upper outlet port and formed with an annular rim around the inlet port constituting a valve seat, a pressure responsive valve of conical form seated on said valve seat, a plurality of guide projections formed integral with said valve and adapted to engage the inner peripheral wall of the valve seat to insure proper seating of the valve, a ball portion on the apex of said valve, a rotatable shaft projecting through the opposite walls of the casing, a valve arm secured at one end to said shaft and formed at its opposite end with a socket adapted to receive the ball shaped portion of the valve, and an arm carrying an adjustable weight and terminating at one end in a yoke, the arms of which engage the free ends of the rotatable shaft.

In witness whereof I have hereunto set my hand and seal this 31st day of March 1921.

FRED C. FANTZ.